UNITED STATES PATENT OFFICE.

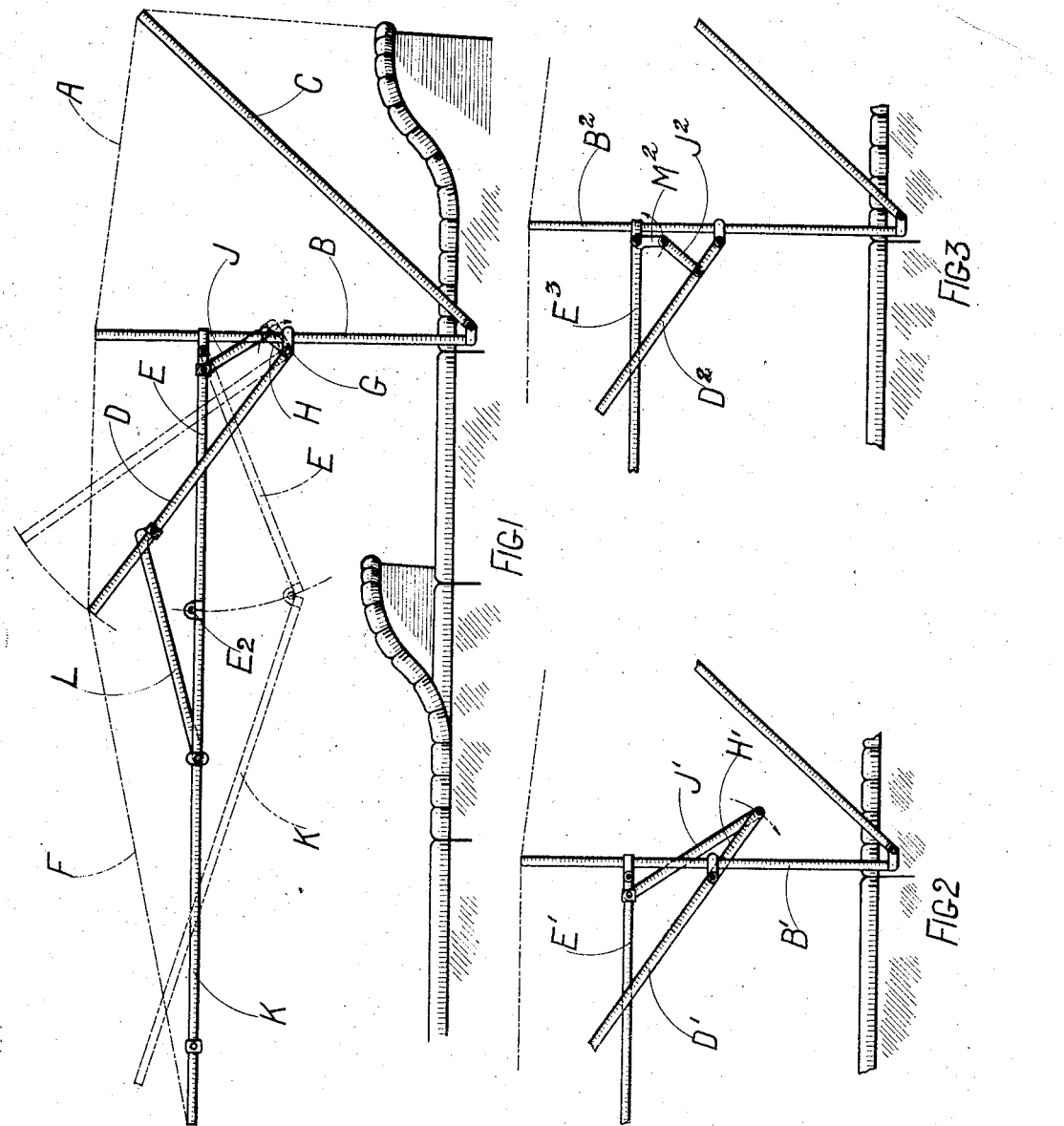

MAX BUCH, OF BIRMINGHAM, ENGLAND.

VEHICLE-HOOD.

1,100,653.   Specification of Letters Patent.   Patented June 16, 1914.

Application filed August 8, 1913. Serial No. 783,742.

*To all whom it may concern:*

Be it known that I, MAX BUCH, a subject of the Emperor of Germany, residing at Birmingham, England, have invented certain new and useful Improvements in Vehicle-Hoods, of which the following is a specification.

This invention relates to cape cart hoods for use on motor vehicles and the like, of the type which comprises a rear hood portion of any ordinary kind and an extension projecting forward approximately horizontally to lie over the front seats, such extension being capable of being extended and collapsed single-handed.

The object of the present invention is to provide an improved construction of hood of the type which, in addition to possessing other advantages, will be easier to work, in that the extension is almost balanced, requiring, without the aid of springs, hardly any more power to extend than to collapse it.

According to this invention, the extension is connected to the rear hood by link members one of which projects slightly beyond its pivot on one of the rear hood sticks, and this projecting part is connected by a rod to the other link member, which is also pivoted to a stick of the rear hood. The short end of the first mentioned link member may lie in a straight line with the rest of the link member, or it may be at an angle thereto so that the first mentioned lever becomes a bell-crank lever. This latter construction is preferred, but in either case either the upper or the lower link member may project in the manner described. One or both of the link members may actually constitute hood sticks and form part of the extension, and to their forward ends may be connected extension pieces etc., according to the design and length of the extension.

The accompanying drawings show three different methods of carrying out the invention.

In Figure 1 the whole of the hood is shown in side elevation, while in Figs. 2 and 3 modified constructions are shown in fragmentary views corresponding to parts of Fig. 1.

Like letters indicate like parts throughout the drawings.

In each case the rear hood part A is supported by hood sticks B and C which are pivoted to the vehicle body at any convenient point. To the front hood stick B is pivoted a hood stick D and link member E which normally project toward the front of the vehicle and assist in supporting the hood extension F. According to the present invention, one of the stick members D or E projects beyond its pivot and such projecting part is linked to the other hood stick. In Fig. 1 the hood stick D projects beyond its pivot G, the projecting part being indicated at H. It will be seen that it projects roughly at right angles to the main stick part D, the complete link D H forming a bell crank lever pivoted at G. The rod or link member J connects the end of the projection H with the link member E.

It will be clear that, assuming the parts to be in the position shown in Fig. 1, if the stick member D is moved backward about its pivot as shown in dotted lines the projection H will move downward to the right as indicated by the arrow and the link member E will be forced downward. The extreme front part of the link member is hinged at E² to the horizontal hood stick K, which may be supported by a link L as shown. The downward movement of the link member E breaks the joint at E² so that the extension frame constituted by the link E and horizontal hood stick K is collapsed as shown in dotted lines. Therefore as the stick member D is moved backward toward the rear hood the extension is collapsed; and the parts can be so proportioned and arranged that the two member D and E and the hood stick K lie flat against one another approximately perpendicularly and close to the hood stick B. The rear hood can then be collapsed in the ordinary way.

In raising the hood the rear hood sticks B and C are moved into the positions illustrated in the ordinary way and the link member D is then moved into the position shown in Fig. 1. The projection H, through the medium of the link J, pushes up the link member E and brings this and the hood stick K into a straight line as shown. The stick member D may be provided with a grip or handle arranged at the best position and the operator grips this to actuate the hood.

In the construction shown in Fig. 2 the stick member D' is extended in a straight line so that the projection H' is continuous with the stick member D'. In Fig. 3 the link member E² is formed as a bell crank with an extension M which is coupled by the link J² to the stick member D². In each case the operation is similar, the movement of one link member by the operator causing the moving of the other link member about its pivot, which tends to straighten out the framework of the extension.

Inasmuch as the members D and E both lie about horizontal and move in opposite directions they can be almost balanced so that the extension is just as easy to open as to close. It will also be noticed that there are few joints and that no "lazy tongs" construction with its large number of joints is employed.

What I claim as my invention, and desire to secure by Letters Patent of the United States, is:—

1. In a vehicle hood, a cover and the combination of a rear hood standard, a hood stick pivotally connected thereto, a jointed hood stick also pivotally connected thereto normally horizontal when the hood is open, an extension on one of said sticks forming a bell crank, and means connecting said bell crank to the other hood stick whereby motion of the first mentioned stick about its pivot operates to break the horizontal stick at its joint.

2. In a vehicle hood, a cover and the combination of a rear hood standard, a hood stick pivotally connected thereto, a jointed hood stick also pivotally connected thereto normally horizontal when the hood is open, an extension on said first mentioned hood stick forming a bell crank, and a link connecting the bell crank to the horizontal hood stick whereby motion of the first mentioned stick about its pivot operates to break the horizontal stick at its joint.

In testimony whereof I have signed my name to this specification in the presence of two subscribing witnesses.

MAX BUCH.

Witnesses:
F. W. HULSE,
V. ROBINSON.